July 23, 1940.  E. LOEWENHAUPT  2,208,933
BATTERY ELIMINATOR
Filed Feb. 15, 1938
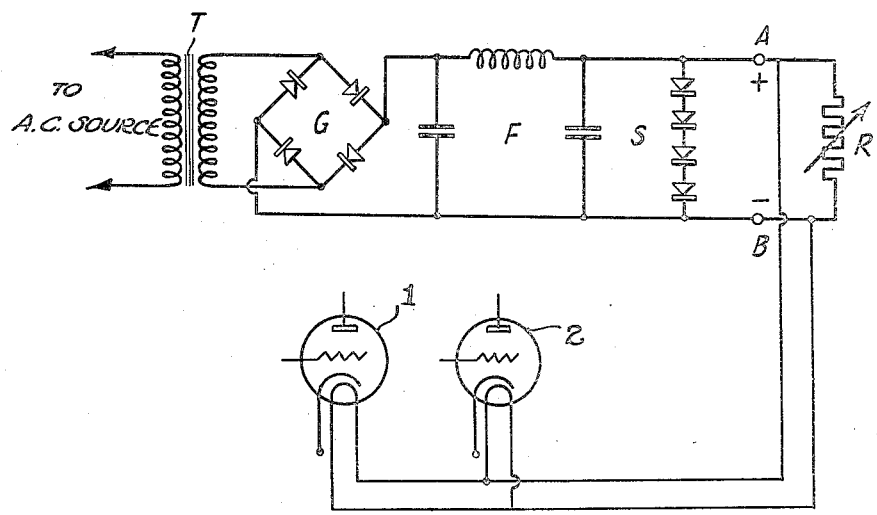
INVENTOR
*EMIL LOEWENHAUPT*
BY
ATTORNEY Patented July 23, 1940

2,208,933

UNITED STATES PATENT OFFICE 2,208,933

BATTERY ELIMINATOR

Emil Loewenhaupt, Berlin-Zehlendorf, Germany, assignor to Telefunken Gesellschaft für Drahtlose Telegraphie m. b. H., Berlin, Germany, a corporation of Germany Application February 15, 1938, Serial No. 190,572
In Germany March 5, 1937

2 Claims. (Cl. 178—44)

It is known to obtain the heating current for the tubes of a receiver by the reduction, rectification, and smoothing of the alternating line voltage. When connecting a receiver or amplifier having several tubes fed in parallel, to such a battery eliminator the disadvantage exists that when one or several tubes fail due to interruption of the contact, fracture, or during exchanging of the tubes or the like, the other tubes absorb more current and thus receive an excessive load. The reason for this lies in the high inner resistance of the battery eliminator, said resistance resulting in a tendency to maintain the total amperage approximately constant when the load changes. This condition can be met in that in the heating line of each individual tube a respective resistor maintaining the partial current constant (for instance an iron-hydrogen resistor) is inserted. But, in this case, a whole series of such current limiting means is required. Furthermore, it will not be possible then to construct the battery eliminator as a separate unit which may be connected as dsired to different amplifiers.

In accordance with the present invention there is placed between the terminals of the battery eliminator that conduct the direct voltage, a dry contact rectifier or the like dimensioned in such a manner, or such a combination of dry contact rectifiers that at a load with a varying number of tubes the voltage varies only within limits which are permissible with regard to the life of the tubes.

It is known as such to provide resistances depending on the voltage such as glow tubes as a protection against over voltages. These resistances can, however, be used only at high voltages and serve primarily for limiting the voltages with regard to variations in the voltage source. The advantage of the invention resides, however, in that in an A. C. battery eliminator for producing the rectified low tension heating voltage for amplifier tubes fed in parallel, an appreciable overload in individual tubes does not occur even where the load is from a different number of tubes. The particular advantage obtained is that when removing individual tubes the other tubes cannot burn out.

An example embodying the idea of the invention is shown in the accompanying figure. The alternating line voltage will be diminished by the transformer T, rectified by the detector arrangement G, and smoothed by the filter chain F. The output terminals A, B are connected with a number of loads in parallel which may comprise filaments of tubes 1 and 2 and any other resistance load which is indicated herein by the variable resistor R. At the normal load of, for instance, 1.5 amperes, the voltage at the terminals A, B is assumed to be 4 volts, while the voltage ahead of the filter be 24 volts. At no-load, the terminal voltage would still increase to 24 volts and at a load reduction it would assume any value between 2 and 24 volts. In accordance with the invention there is connected in parallel to the output terminals a chain S comprising four selenium-dry rectifiers placed in series in the same sense and by which at a terminal voltage of 4 volts only, a minor parallel current of about 0.5 ampere flows, since the rectifiers operate in the lower portion of their current-voltage characteristics. At each voltage increase due to a decrease in the load the parallel current increases rapidly, thus preventing a larger increase in the voltage. Thus, in this special arrangement the terminal voltage increases automatically only up to 7 volts instead of 24 volts at no-load operation.

The rectifier chain maintains the voltage approximately constant also at larger fluctuations of the network voltage.

The number of rectifiers placed in series is to be determined such that each rectifier operates at a possibly steep place of its resistance characteristic. To obtain a possibly great total steepness it will be of advantage to place in parallel several rectifiers or chains of rectifiers connected in series.

I claim:

1. In a power conditioning circuit provided with a pair of input terminals adapted to be connected to a power supply network and a pair of output terminals, a filter circuit interposed between said input terminals and said output terminals, a plurality of loads in parallel connected across said output terminals and means for preventing the application of excessive voltage to any of said loads upon removal of one of them comprising a plurality of dry rectifiers connected in series directly across said output terminals.

2. An arrangement as described in the next preceding claim, characterized by that said dry rectifiers are selenium dry contact rectifiers and by that the plurality of parallel loads comprise the cathodes of a plurality of electronic tubes.

EMIL LOEWENHAUPT.